(12) United States Patent
Trutna, Jr. et al.

(10) Patent No.: US 8,094,704 B2
(45) Date of Patent: Jan. 10, 2012

(54) DETECTING WIRELESS CHANNEL STATUS FROM ACOUSTIC DISCRIMINATION OF SPECTRAL CONTENT

(75) Inventors: William R. Trutna, Jr., Atherton, CA (US); Steven Rosenau, Mountain View, CA (US); Ken Nishimura, Fremont, CA (US); Graham Flower, San Jose, CA (US); Richard Ruby, Menlo Park, CA (US); Michael Louis Frank, Menlo Park, CA (US); Mark Unkrich, Redwood City, CA (US)

(73) Assignee: Avago Technologies Wiresless IP (Singapore) Pte. Ltd., Singapore (SG)

( * ) Notice: Subject to any disclaimer, the term of this patent is extended or adjusted under 35 U.S.C. 154(b) by 974 days.

(21) Appl. No.: 11/226,974

(22) Filed: Sep. 15, 2005

(65) Prior Publication Data

US 2007/0058707 A1 Mar. 15, 2007

(51) Int. Cl.
*H04B 3/46* (2006.01)
(52) U.S. Cl. ......... 375/224; 375/227; 375/213; 375/220
(58) Field of Classification Search .................. 375/224, 375/227, 213, 220
See application file for complete search history.

(56) References Cited

U.S. PATENT DOCUMENTS

| | | |
|---|---|---|
| 3,913,017 A | 10/1975 | Imaseki |
| 4,130,771 A | 12/1978 | Bottom |
| 4,155,040 A | 5/1979 | Harmon et al. |
| 4,672,657 A | 6/1987 | Dershowitz |
| 4,827,229 A * | 5/1989 | Sabet-Peyman et al. ..... 333/187 |
| 4,894,856 A | 1/1990 | Nakanishi et al. |
| 5,162,724 A * | 11/1992 | Katayama et al. ......... 324/76.19 |
| 5,287,400 A | 2/1994 | Saegusa |
| 5,587,620 A | 12/1996 | Ruby et al. |
| 5,608,360 A | 3/1997 | Driscoll |
| 5,870,351 A | 2/1999 | Ladabaum et al. |
| 5,873,153 A | 2/1999 | Ruby et al. |
| 5,883,575 A | 3/1999 | Ruby et al. |
| 6,420,820 B1 | 7/2002 | Larson, III |
| 6,507,983 B1 | 1/2003 | Ruby et al. |
| 6,550,664 B2 | 4/2003 | Bradley et al. |
| 6,600,390 B2 | 7/2003 | Frank |
| 6,822,929 B1 * | 11/2004 | Schubert et al. ............. 367/181 |
| 6,833,754 B2 | 12/2004 | Lancaster |
| 6,870,445 B2 | 3/2005 | Kawakubo et al. |
| 6,946,928 B2 | 9/2005 | Larson, III et al. |
| 2004/0227578 A1 * | 11/2004 | Hamalainen .............. 331/107 A |
| 2005/0140354 A1 * | 6/2005 | Meir ......................... 324/76.22 |

OTHER PUBLICATIONS

Dubois, Mark-Alexandre, "Thin Bulk Acoustic Wave Resonators: A Technology Overview", MEMSWAVE 03, Toulous, France Jul. 2-4, 2003.

* cited by examiner

*Primary Examiner* — Kabir A Timory

(57) ABSTRACT

Systems and methods of detecting wireless channel status from acoustic discrimination of spectral content are described. In one aspect, a wireless system includes a spectrum analyzer, a detector, and a controller. The spectrum analyzer is operable to acoustically discriminate spectral content of an input electrical signal in multiple discrete frequency channels. The detector is operable to determine respective statuses of the frequency channels from the acoustically discriminated spectral content. The controller is operable to select one of the frequency channels based on the determined statuses of the frequency channels.

14 Claims, 4 Drawing Sheets

DETECTING WIRELESS CHANNEL STATUS FROM ACOUSTIC DISCRIMINATION OF SPECTRAL CONTENT

CROSS-REFERENCE TO RELATED APPLICATIONS

This application is related to U.S. patent application Ser. No. 11/119,285, filed Apr. 29, 2005, by William R. Trutna, Jr. et al. and entitled "Resonator-Based Spectrum Analyzer and Method," which is incorporated herein by reference.

BACKGROUND

A wide variety of different wireless devices have been developed, including wireless network devices, wireless telephones (e.g., cordless and cellular telephones), and wireless controllers (e.g., wireless computer mice and wireless video game controllers). In order to accommodate multiple wireless devices within the same coverage area, the spectral bandwidth that is designated for the coverage area is divided into multiple frequency channels. Wireless devices within the coverage area communicate over respective ones of the frequency channels. Unused (or unoccupied) frequency channels are assigned to the wireless devices in the coverage area in accordance with a predetermined channel assignment strategy.

Some wireless devices are configured to communicate over a single frequency channel. Other wireless devices include switches that allow their users to select different frequency channels manually. Still other wireless communication devices include channel selectors that select frequency channels for wireless communications automatically. The channel selectors typically include a circuit that sequentially scans through all of the pre-allocated frequency channels for unused ones of the frequency channels.

The process of sequentially scanning through the pre-allocated frequency channels tends to be slow. In addition, existing automated channel selector implementations are large and expensive, making them less suitable for many mobile wireless applications and price-sensitive consumer wireless applications, such as wireless telephony and wireless controllers.

SUMMARY

In one aspect, the invention features a wireless system that includes a spectrum analyzer, a detector, and a controller. The spectrum analyzer is operable to acoustically discriminate spectral content of an input electrical signal in multiple discrete frequency channels. The detector is operable to determine respective statuses of the frequency channels from the acoustically discriminated spectral content. The controller is operable to select one of the frequency channels based on the determined statuses of the frequency channels.

In another aspect, the invention features a wireless method in accordance with which spectral content of an input electrical signal is acoustically discriminated in multiple discrete frequency channels. Respective statuses of the frequency channels are determined from the acoustically discriminated spectral content. At least one of the frequency channels is selected based on the determined statuses of the frequency channels.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below detect wireless channel status from acoustic discrimination of spectral content. In some implementations, these embodiments are capable of quickly identifying unoccupied ones of the pre-allocated frequency channels that can be assigned for wireless communications. Some of these embodiments may be implemented with relatively small and inexpensive components, making them highly suitable for all wireless communication applications, including mobile wireless applications and price-sensitive consumer wireless applications, such as wireless telephony and wireless controllers.

As used herein the term "wireless" refers to any form of non-wired signal transmission, including AM and FM radio transmission, TV transmission, cellular telephone transmission, portable telephone transmission, and wireless LAN (local area network) transmission. A wide variety of different methods and technologies may be are used to provide wireless transmissions, including infrared line of sight methods, cellular methods, microwave methods, satellite methods, packet radio methods, and spread spectrum methods.

II. General Architecture and Operation of Embodiments of the Wireless System

Figure 1:
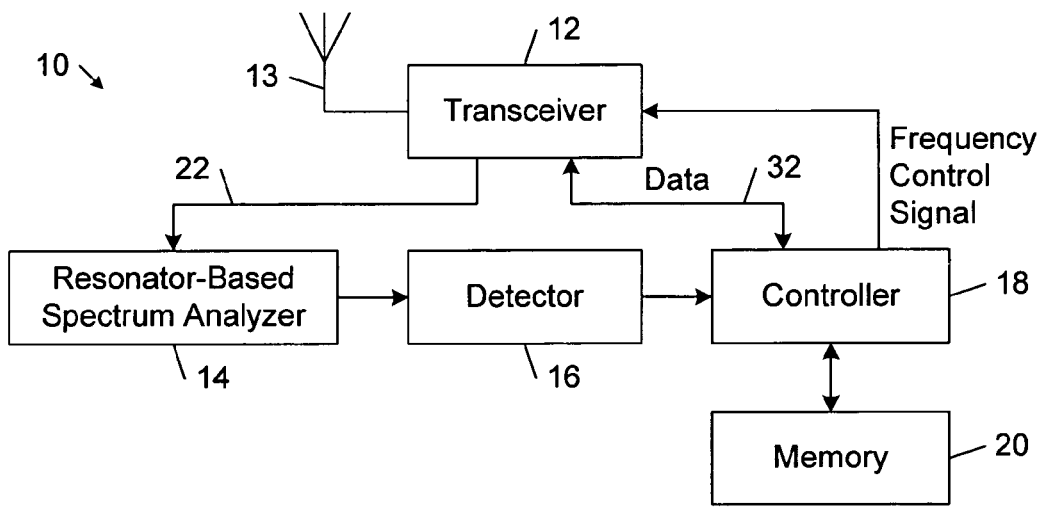
FIG. 1 is a block diagram of an embodiment of a wireless system that includes a transceiver, a resonator-based spectrum analyzer, a detector, a controller, and a memory.

FIG. 1 shows an embodiment of a wireless system 10 that includes a transceiver 12 that is electrically coupled to an antenna 13, a resonator-based spectrum analyzer 14, a detector 16, a controller 18, and a memory 20. The transceiver 12 includes a wireless transmitter and a wireless receiver. The transceiver 12 may operate in a half-duplex mode in which the transceiver 12 is not able to receive incoming wireless signals while transmitting outgoing signals or in a full-duplex mode in which the transceiver 12 is able to receive incoming signals while transmitting outgoing wireless signals. The receiver portion of the transceiver 12 converts an incoming wireless signal into an input electrical signal 22 that is analyzed by the resonator-based spectrum analyzer 14. The resonator-based spectrum analyzer 14 generates output electrical signals corresponding to an acoustic discrimination of the spectral contents of the input electrical signal 22 in respective predetermined frequency channels in a specified frequency range that is allocated to the wireless system for wireless communications. The detector 16 determines the status of each of the frequency channels based on the corresponding ones of the output electrical signals that are generated by the resonator-based spectrum analyzer 14. The controller 18 selects one of the frequency channels based on the statuses determined by the detector 16. The controller 18 generates a frequency control signal 24 that sets the carrier frequency of at least one of the transmitter and receiver portions of the transceiver 12 to the frequency of the selected frequency channel.

Figure 2:
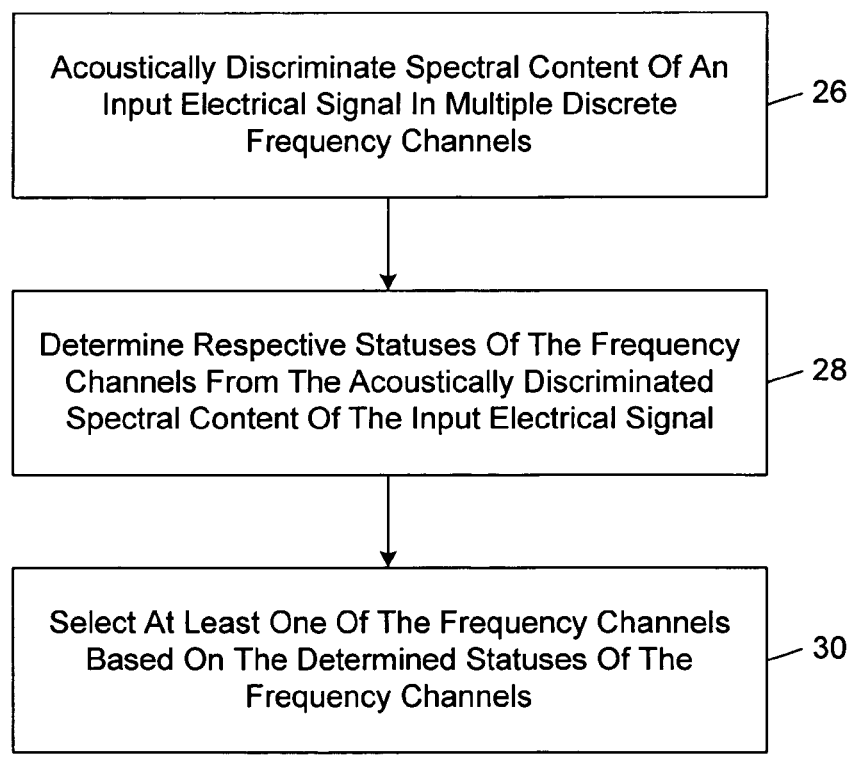
FIG. 2 is a flow diagram of an embodiment of an operational method that is executed by components of the wireless system shown in FIG. 1.

FIG. 2 shows an embodiment of a method by which the wireless system 10 selects one of the predetermined frequency channels in the specified frequency range.

In accordance with this method, the resonator-based spectrum analyzer 14 acoustically discriminates spectral content of the input electrical signal 22 that is received from the receiver portion of the transceiver 12 in multiple discrete frequency channels (block 26). In some implementations, the resonator-based spectrum analyzer 14 generates output signals that are indicative of the respective contents (e.g., amplitude or energy) of the input electrical signal at the channel frequencies. In some implementations, the resonator-based spectrum analyzer 14 acoustically discriminates the spectral content of the input electrical signal 22 in all of the frequency channels in parallel, increasing the speed with which the specified frequency range allocated to the wireless system 10 may be scanned for unoccupied ones of the frequency channels.

The detector 16 determines respective statuses of the frequency channels from the output electrical signals that are generated by the resonator-based spectrum analyzer 14 (block 28). In some implementations, the detector 16 determines these statuses by thresholding the output electrical signals produced by the resonator-based spectrum analyzer 14, where ones of the output electrical signals that have values on one side of the respective thresholds are determined to correspond to occupied frequency channels and ones of the output signals that have values on the other side of the respective thresholds are determined to correspond to unoccupied frequency channels.

The controller 18 selects at least one of the frequency channels based on the statuses determined by the detector 16 (block 30). In general, the controller 18 may select the at least one frequency channel based on any one of a wide variety of channel selection methods, including selecting the first unoccupied frequency channel in a predetermined ordering of the frequency channels and selecting the unoccupied frequency channel with the highest signal-to-noise ratio.

In some implementations, the controller 18 sets the carrier frequency for at least one of the transmission and reception frequencies of the transceiver 12 to the frequency of the selected frequency channel. In some implementations, the controller 18 causes the transceiver to transmit data 32, from which information about the selected frequency channel may be determined, to a receiving wireless device or system. For example, the controller 18 may transmit an identifier of the selected frequency channel that informs a receiving wireless device that the selected frequency channel is unoccupied and therefore is available for wireless communications.

The wireless system 10 may communicate with other electrical devices, systems, and appliances over one or more radio frequency (RF) or infrared (IR) communication channels in accordance with a particular communication protocol (or interface). The RF communication channels typically may lie within the 46-49 MHz frequency band, the 902-928 MHz frequency band, or the 2.4-2.48 GHz frequency band. The RF communication protocol may be any of the short-range radio communication protocols that have been proposed, including the Bluetooth communication protocol and the IEEE 802.11 (radio-LAN) communication protocol. Alternatively, the wireless system 10 may communicate with a wireless network over one or more long-range radio frequency (RF) communication channels (e.g., a conventional cellular or a 3G or 4G wireless communication channel) in accordance with a conventional RF communication protocol (e.g., the Wireless Application Protocol (WAP)). An example of an IR communication protocol is the IrDA (Infrared Data Association) communication protocol.

The controller 18 may be implemented in any computing or processing environment, including in digital electrical circuitry or in computer hardware, firmware, or software. In some embodiments, the controller 18 is implemented by machine-readable instructions that are executed by a data processor (e.g., a microcontroller, a microprocessor, or ASIC (application-specific integrated circuit)).

Machine-readable instructions for implementing the controller 18 and the data generated by the controller 18 are tangibly embodied in the memory 20. The memory 20 may include any type of machine-readable media, including all forms of non-volatile memory, including, for example, semiconductor memory devices, such as EPROM, EEPROM, and flash memory devices, magnetic disks such as internal hard disks and removable disks, magneto-optical disks, and CD-ROM.

Figure 3:
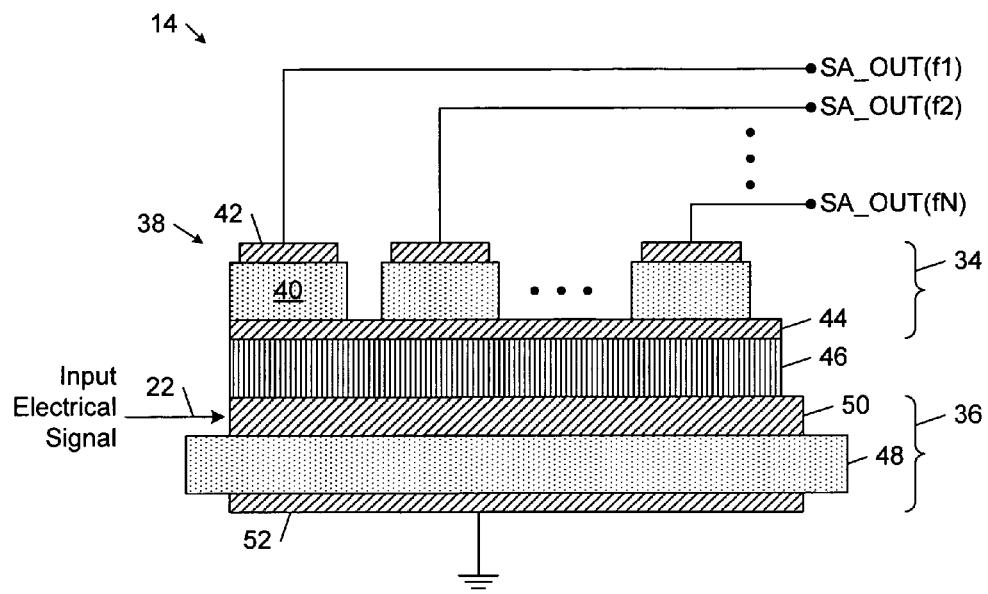
FIG. 3 is a diagrammatic sectional view of an embodiment of the resonator-based spectrum analyzer shown in FIG. 1.

III. Detailed Description of Embodiments of the Resonator-Based Spectrum Analyzer FIG. 3 shows an embodiment of the resonator-base spectrum analyzer 14. In this embodiment, the resonator-based spectrum analyzer 14 includes multiple channel-defining acoustic resonators 34, each of which has a different respective resonant response defining a corresponding one of the predetermined frequency channels. The resonator-based spectrum analyzer 14 additionally includes an input acoustic resonator 36 that is acoustically coupled to the channel-defining acoustic resonators 34. The input acoustic resonator 36 has a broadband response over a specified range of frequencies that encompasses the frequency channels. The number of the channel-defining acoustic resonators 34 and the frequency spacing between their respective resonant responses are selected to cover the specified frequency range.

In general, each of the channel-defining acoustic resonators 34 and the input acoustic resonator 36 may be any type of acoustic resonator, including Bulk Acoustic Wave (BAW) resonators that are formed from one or more piezoelectric layers disposed between two electrodes. Exemplary types of BAW resonators are thin Film Bulk Acoustic wave Resonators (FBARs) and Stacked thin film Bulk Acoustic wave Resonators (SBARs). FBARs typically include a single piezoelectric layer between two electrodes. SBARs, on the other hand, typically include two piezoelectric layers disposed between top and bottom electrode layers and separated from each other by a middle electrode, which typically is used as a grounding electrode.

In the illustrated embodiment, each of the channel-defining acoustic resonators 34 is implemented by a respective FBAR 38. Each FBAR 38 is formed from a respective thin film piezoelectric structure 40 that is between a respective top electrode 42 and a common bottom electrode 44. The piezoelectric structure 40 may be formed from one or more layers of piezoelectric material. The one or more piezoelectric layers may be formed of a wurtzite-type hexagonal crystal, such as cadmium sulfide, cadmium selenide, zinc oxide, beryllium oxide, aluminum nitride, and wurtzite zinc sulfide, and solid solutions thereof, and lead-zirconate-titanate (PZT). Alternatively, the one or more piezoelectric layers may be formed of a non-wurtzite-type hexagonal crystal piezoelectric material, such as a sphalerite cubic crystal. The top and bottom electrodes 42, 44 may be formed from one of Mo, Al, Au, Pt, Ti, and alloys thereof. Each of the channel-defining FBARs 38 may be fabricated using one or more thin film deposition techniques, photolithographic techniques, and micro-machining techniques.

In the illustrated embodiment, the common bottom electrode 44 is formed on an acoustic coupling structure 46. The acoustic coupling structure 46 may be formed of high-resistivity silicon, alumina, glass, ceramic, sapphire or one or more of any number of electrically-insulating materials. Alternatively, the acoustic coupling structure 46 may be composed of an at least partially electrically conducting material and at least one electrically insulating layer. In these embodiments, the acoustic coupling structure 46 electrically insulates the channel-defining acoustic resonators 34 from the input acoustic resonator 36. In other embodiments, the acoustic coupling structure 46 may be electrically conducting. In these embodiments, the bottom electrode 52 of the input acoustic resonator 36 may be coupled to a single-ended driver of the input electrical signal 22, and the top electrode 50 of the input acoustic resonator 36 and the bottom electrode 44 of the channel-defining FBARs 38 may be connected to a common ground. In some embodiments, the acoustic coupling structure 46 may be omitted.

The acoustic coupling structure 46 is formed on the input acoustic resonator 36. In the illustrated embodiment, the input acoustic resonator 36 is implemented by an input FBAR structure that includes a piezoelectric structure 48 between a top electrode 50 and a bottom electrode 52. The piezoelectric structure 48 may be formed from one or more layers of piezoelectric material. The one or more piezoelectric layers may be formed of a wurtzite-type hexagonal crystal, such as cadmium sulfide, cadmium selenide, zinc oxide, beryllium oxide, aluminum nitride, and wurtzite zinc sulfide, and solid solutions thereof, and lead-zirconate-titanate (PZT). Alternatively, the one or more piezoelectric layers may be formed of a non-wurtzite-type hexagonal crystal piezoelectric material, such as a sphalerite cubic crystal. The top and bottom electrodes 50, 52 may be formed from one of Mo, Al, Au, Pt, Ti, and alloys thereof. The input FBAR structure may be fabricated using one or more thin film deposition techniques, photolithographic techniques, and micro-machining techniques.

In general, the resonant frequencies of the channel-defining acoustic resonators 34 and the input acoustic resonator 36 are determined primarily by the thicknesses of the piezoelectric structures and secondarily by the thicknesses and the materials used for the other layers. Each of the channel-defining acoustic resonators 34 and the input acoustic resonator 36 is characterized by a mechanical resonant frequency corresponding to the frequency at which the half wavelength (or integer multiples of a half wavelength) of a sound wave propagating in the resonator is approximately equal to the total thickness of the resonator for a given velocity of sound in the resonator.

The thicknesses and compositions of each of the channel-defining acoustic resonators 34 are selected so that the channel-defining acoustic resonators 34 have different resonant frequencies that coincide with the frequencies of a specified set of predetermined frequency channels. In some embodiments, the resonant frequencies of the channel-defining acoustic resonators 34 are tuned by adding one or more tuning layers to the channel-defining acoustic resonators (e.g., on top of the top electrodes 42. The tuning layers may be electrically conducting or electrically insulating. In addition, the channel-defining acoustic resonators 34 are constructed and arranged to have quality factor values (or Q-values) that are sufficiently high so that there is insubstantial overlap of the frequency passbands of the channel-defining acoustic resonators 34. The Q-value measures the ratio between the stored energy and lost energy in an acoustic resonator. The Q-value of a resonator is greatly affected by the quality of the deposited electrodes and the piezoelectric layers.

The thickness and composition of the input acoustic resonator 36 are selected so that the input acoustic resonator 36 has a resonant frequency that substantially coincides with a central portion of the specified range of frequencies that encompasses the set of predetermined frequency channels. In addition, the input acoustic resonator 36 is constructed and arranged to have a Q-value that is lower than the Q-values of the channel-defining acoustic resonators 34. The bandwidth of the input acoustic resonator 36 encompasses all of the predetermined channel frequencies.

In operation, the electrical input signal 22 that is generated by the transceiver 12 is applied across the electrodes 50, 52 of the input acoustic resonator 36. The piezoelectric structure 48 converts a portion of the applied electrical energy into mechanical energy in the form of sound waves. The sound waves propagate in the direction of the applied electric field through the acoustic coupling structure 46 to the set of channel-defining acoustic resonators 34. The channel-defining acoustic resonators 34 convert respective spectral components of the acoustic energy coupled from the input acoustic resonator 36 that coincide with the respective resonant passband frequencies of the channel-defining acoustic resonators 34. The channel-defining acoustic resonators 34 convert these resonant spectral components into respective output electrical signals (i.e., SA_OUT(f1), SA_OUT(f2), . . . , SA_OUT(fN)). The magnitudes of these output electrical signals correspond to the spectral energy content of the wireless signals detected by the antenna 13 at the corresponding channel frequencies.

Figure 4:
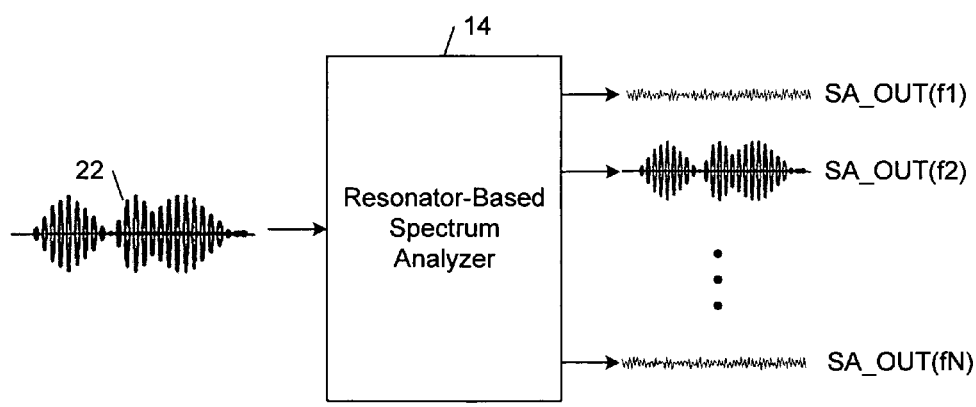
FIG. 4 is a block diagram of an embodiment of the resonator-based spectrum analyzer shown in FIG. 3 receiving an input electrical signal and producing a respective output electrical signal for each of multiple frequency channels.

FIG. 4 shows an exemplary case in which the antenna 13 picks up only a single wireless signal in the frequency channel f2. As a result, the input electrical signal 22 contains only a single carrier frequency corresponding to the frequency channel f2, which coincides with the resonant frequency of the channel-defining acoustic resonator that produces the output electrical signal SA_OUT(f2). In this exemplary case, the other channel-defining acoustic resonators 34 produce respective output electrical signals that consist mainly of low-magnitude noise.

The operating frequency band of the resonator-based spectrum analyzer 14 typically lies in the range from tens of kilohertz to hundreds of megahertz, or greater, depending on the specified range of wireless frequencies that is to be analyzed. For typical wireless applications, the resonator-based spectrum analyzer 14 can be implemented in a die area that is on the order of one square millimeter or smaller, which is significantly smaller than the area required for typical spectrum analyzer devices. The nature of the resonator-based spectrum analyzer 14 allows it to be fabricated using high-volume integrated circuit fabrication methods. In addition, some embodiments of the resonator-based spectrum analyzer 14 may be manufactured on the same substrates (e.g., silicon substrates) with other integrated circuit elements (e.g., CMOS circuits and devices). These features of the resonator-based spectrum analyzer 14 significantly lower the manufacturing costs relative to other types of spectrum analyzers.

IV. Detailed Description of Embodiments of the Detector

Figure 5:
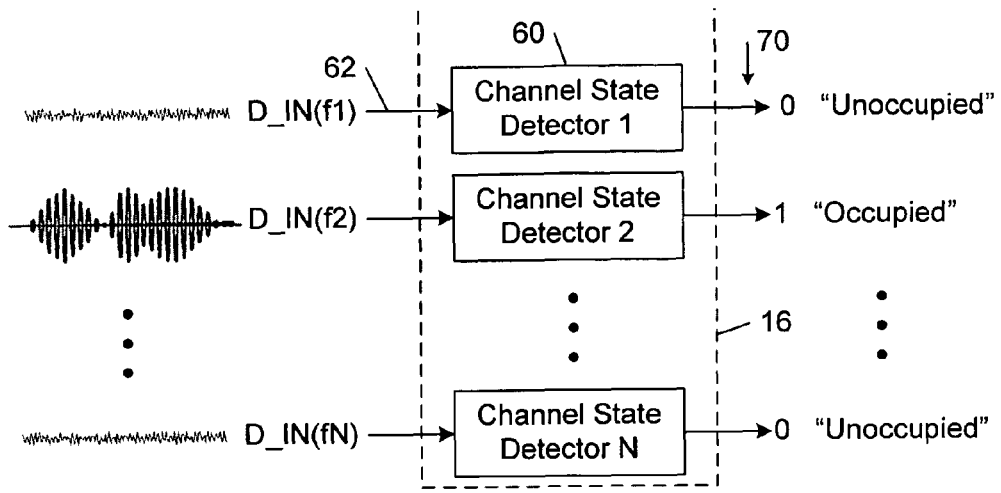
FIG. 5 is a block diagram of an embodiment of a detector that includes a respective channel state detector for each of multiple frequency channels.

FIG. 5 shows an embodiment of the detector 16 that includes a separate channel state detector 60 for each of the predetermined frequency channels. Each channel state detector 60 receives a respective input electrical signal 62 (i.e., D_IN(f1), D_IN(f2), . . . , D_IN(fN)) that corresponds to a respective one of the output electrical signals (i.e., SA_OUT (f1), SA_OUT(f2), . . . , SA_OUT(fN)) that is produced by the resonator-based spectrum analyzer 14. The input electrical signals 62 may correspond exactly to the output electrical signals produced by the resonator-based spectrum analyzer 14 or they may correspond to amplified, filtered, or otherwise processed versions of the output electrical signals produced by the resonator-based spectrum analyzer 14. Each of the channel state detectors 60 determines a status (e.g., occupied or unoccupied) of the corresponding frequency channel based on the magnitude of the received input electrical signal 62. In general, the channel state detectors 60 may be implemented by any one of a wide variety of different electrical circuits.

Figure 6:
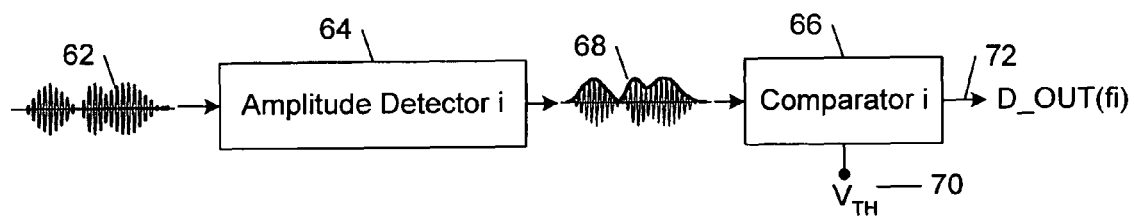
FIG. 6 is a block diagram of an embodiment of one of the channel state detectors shown in FIG. 5.

FIG. 6 shows an embodiment of one of the channel state detectors 60 (i.e., channel state detector i, where i has an integer value in a range from 1 to N) that includes an amplitude detector 64 and a comparator 66. The amplitude detector 64 generates an output amplitude signal 68 that corresponds to the amplitude of the input electrical signal 62 (i.e., D_IN (fi)). The comparator 66 compares the output amplitude signal 68 to a threshold 70 (i.e., $V_{TH}$) and produces an output signal 72 (i.e., D_OUT(fi)) that has a first value (e.g., "1") when the output amplitude signal 62 is greater than or equal to the threshold 70 and has a second value (e.g., "0") when the output amplitude signal 62 is below the threshold 72. In general, the respective thresholds 70 that are applied to the different comparators 66 may be the same or different.

Figure 7:
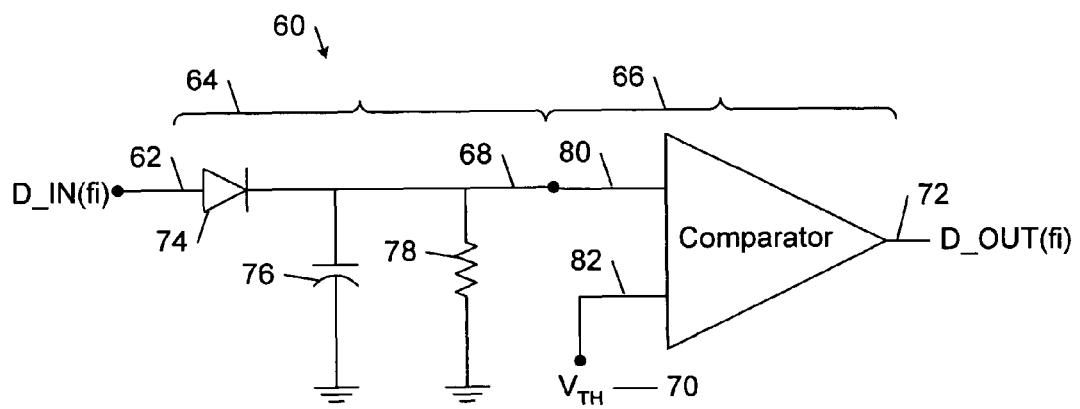
FIG. 7 is a circuit diagram of an embodiment of the channel state detector shown in FIG. 6.

FIG. 7 shows an embodiment of the channel state detector 60 in which the amplitude detector 64 is an envelope detector, which includes a diode 74, a capacitor 76, and a resistor 78. When the amplitude of the input signal D_IN(fi) increases, the voltage across the capacitor 76 increases via the rectifying diode 74. When the amplitude of the input signal D_IN(fi) decreases, the voltage across the capacitor 76 decreases as it discharges through the resistor 78. The comparator 66 has a first input 80 connected to the output of the envelope detector and a second input 82 connected to the reference voltage ($V_{TH}$). The comparator 66 compares the instantaneous value of the signal voltage at the first input 80 with the reference voltage on the second input 82, and produces a digital 1 or 0 at the output when one of the first and second inputs 80, 82 is higher than the other.

Figure 8:
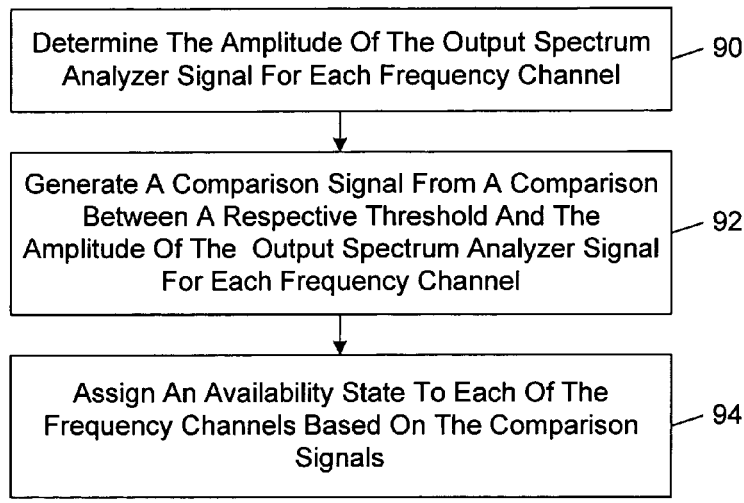
FIG. 8 is a flow diagram of an embodiment of a method of determining respective statuses of frequency channels from acoustically discriminated spectral content of an input electrical signal.

FIG. 8 shows an embodiment of a method in accordance with which the detector 16 determines respective statuses of the predetermined frequency channels from the output electrical signals that are produced by the resonator-base spectrum analyzer 14.

In accordance with this method, the detector 16 determines the amplitude of the output spectrum analyzer signal for each frequency channel (block 90). In the embodiments shown in FIGS. 6 and 7, the amplitude detectors 64 determine the amplitudes of the output electrical signals produced by the resonator-based spectrum analyzer 14.

The detector 16 generates a comparison signal from a comparison between a respective threshold and the amplitude of the output spectrum analyzer signal for each frequency channel (block 92). The detector 16 then assigns an availability state to each of the frequency channels based on the comparison signals (block 94). In the embodiments shown in FIGS. 6 and 7, the comparators 66 generate the comparison signals (internally) and assign availability states to the frequency channels by setting the values of each of the output signals 70 to a digital 1 or 0.

V. Specific Implementations of the Wireless System

In general, the wireless system 10 may be incorporated in any of a wide variety of different portable and stationary wireless devices, including a wireless networking device, a wireless telephone (e.g., a cordless telephone and a cellular telephone), a pager, a wireless controller (e.g., wireless computer mice and wireless video game controllers), and a computer (e.g., a portable computer, such as a personal digital assistant or a laptop or notebook computer).

Figure 9:
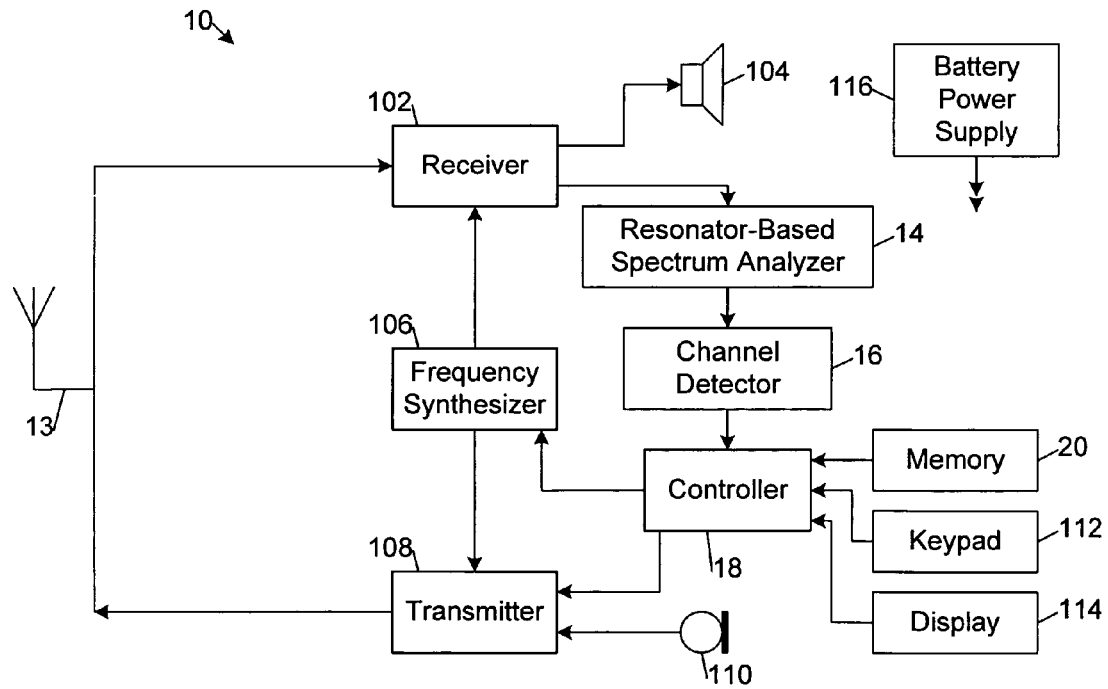
FIG. 9 is block diagram of an embodiment of a wireless telephone that incorporates the wireless system shown in FIG. 1.

FIG. 9 shows an embodiment of the wireless system 10 that implemented in the form of a wireless telephone handset (e.g., cordless telephone handset or a cellular telephone handset). In this embodiment, the wireless system includes a receiver 102, a speaker 104, a frequency synthesizer 106, a transmitter 108, a microphone 110, a keypad 112, a display 114, and a battery power supply 116. The controller 18 choreographs the operations of the receiver 102, the transmitter 108, and the frequency synthesizer 106. The frequency synthesizer 106 controls the operating frequencies of receiver 102 and transmitter 108, and generates electronic ring signals in response to control signals received from controller 18.

In operation, telephone calls may be placed and received through the wireless system 10, which communicates with a cordless or cellular base station over one of the available voice channels selected by the controller 18 based on the determined statuses of the frequency channels as explained above. The base station may exchange voice signals between a PSTN (Public Switched Telephone Network) and the wireless system 10. For example, when a call initially is received from the PSTN, the base station transmits a ring signal to the wireless system 10 over an RF control channel. In response, the speaker 104 generates an audible ring signal from an electronic ring signal received from frequency synthesizer 106. After the user takes the wireless system 10 off hook, the base station transmits a voice signal from the PSTN to the wireless system 10 over a selected one of the available voice channels. The antenna 13 converts the RF communication signals received from the base station into electrical signals. The receiver 102 filters and demodulates the electrical signals to produce electrical voice signals. The speaker 104 generates from the electrical voice signals an audible voice message for the user of the wireless system 10. The microphone 110 converts responsive audible voice messages received from the user of the wireless system into an electrical voice signals. The transmitter 108 modulates the electrical voice signals onto a radio carrier supplied by the frequency synthesizer 106. The antenna 13 transmits the radio carrier at the selected channel frequency and modulated with the responsive voice message to the base station.

VI. Conclusion

The embodiments that are described in detail above detect wireless channel status from acoustic discrimination of spectral content. In some implementations, these embodiments are capable of quickly identifying unoccupied ones of the pre-allocated frequency channels that can be assigned for wireless communications. Some of these embodiments may be implemented with relatively small and inexpensive components, making them highly suitable for all wireless communication applications, including mobile wireless applications and price-sensitive consumer wireless applications, such as wireless telephony and wireless controllers.

Other embodiments are within the scope of the claims.

What is claimed is:

1. A wireless system, comprising:
   a spectrum analyzer configured to acoustically discriminate spectral content of an input electrical signal in multiple discrete frequency channels, the spectrum analyzer comprising: multiple channel-defining acoustic resonators each having a different respective resonant response defining a corresponding one of the multiple discrete frequency channels, wherein the multiple channel-defining acoustic resonators each comprise a BAW resonator; and an input bulk acoustic wave (BAW) resonator acoustically coupled to the channel-defining acoustic resonators;
   a detector configured to determine respective statuses of the frequency channels from the acoustically discriminated spectral content, wherein the detector is operable to assign an availability state to each of the frequency channels based on the acoustically discriminated spectral content; and
   a controller configured to select at least one of the frequency channels based on the determined statuses of the frequency channels, wherein the controller is operable to select one of the frequency channels having an unoccupied availability state.

2. The system of claim 1, wherein the input acoustic resonator further comprises one of a film bulk acoustic resonator (FBAR), or a surface mounted acoustic resonator (SMR), or a stacked bulk acoustic resonator (SBAR).

3. The system of claim 1, wherein each of the channel-defining acoustic resonators comprises one of a film bulk acoustic resonator (FBAR), or a surface mounted acoustic resonator (SMR), or a stacked bulk acoustic resonator (SBAR).

4. The system of claim 1, wherein each of the channel-defining acoustic resonators supports resonant acoustic signals coinciding with spectral content of the input electrical signal in the corresponding frequency channels.

5. The system of claim 4, wherein each of the channel-defining acoustic resonators converts the supported acoustic signal into a corresponding electrical signal.

6. The system of claim 1, wherein the detector comprises a separate channel state detector for each of the frequency channels.

7. The system of claim 6, wherein each of the channel state detectors comprises a respective amplitude detector operable to produce an output signal indicative of an amplitude of an input signal corresponding to an output signal generated by the spectrum analyzer for a respective one of the frequency channels.

8. The system of claim 7, wherein each of the amplitude detectors is an envelope detector.

9. The system of claim 7, wherein each of the channel state detectors additionally comprises a respective comparator operable to produce a comparison signal from a comparison between the output signal of the corresponding amplitude detector and a respective threshold.

10. The system of claim 1, wherein the controller is operable to rank the frequency channels based on statistics of the availability states assigned to the frequency channels.

11. The system of claim 10, wherein the controller is operable to rank the frequency channels based on respective durations over which the frequency channels are assigned unoccupied availability states.

12. The system of claim 10, wherein the controller is operable to rank frequency channels based on respective rates at which the availability states assigned to the frequency channels change.

13. The system of claim 1 incorporated in a wireless telephone handset.

14. A wireless system, comprising:
   a spectrum analyzer configured to acoustically discriminate spectral content of an input electrical signal in multiple discrete frequency channels, the spectrum analyzer comprising: multiple channel-defining acoustic resonators each having a different respective resonant response defining a corresponding one of the multiple discrete frequency channels, wherein the multiple channel-defining acoustic resonators each comprise a BAW resonator; and an input bulk acoustic wave (BAW) resonator acoustically coupled to the channel-defining acoustic resonators;
   a detector configured to determine respective statuses of the frequency channels from the acoustically discriminated spectral content; and
   a controller configured to select at least one of the frequency channels based on the determined statuses of the frequency channels.

* * * * *